US008381212B2

(12) United States Patent
Brelsford et al.

(10) Patent No.: US 8,381,212 B2
(45) Date of Patent: Feb. 19, 2013

(54) DYNAMIC ALLOCATION AND PARTITIONING OF COMPUTE NODES IN HIERARCHICAL JOB SCHEDULING

(75) Inventors: David P. Brelsford, Hyde Park, NY (US); Waiman Chan, Poughkeepsie, NY (US); Stephen C. Hughes, Poughkeepsie, NY (US); Kailash N. Marthi, Poughkeepsie, NY (US); Ravindra R. Sure, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1234 days.

(21) Appl. No.: 11/869,133

(22) Filed: Oct. 9, 2007

(65) Prior Publication Data

US 2009/0094605 A1   Apr. 9, 2009

(51) Int. Cl.
*G06F 9/50* (2006.01)
*G06F 15/16* (2006.01)
*G06F 15/173* (2006.01)

(52) U.S. Cl. .................... 718/100; 709/201; 709/226
(58) Field of Classification Search .................. None
See application file for complete search history.

(56) References Cited

U.S. PATENT DOCUMENTS

| | | | | |
|---|---|---|---|---|
| 6,954,932 B2* | 10/2005 | Nakamura et al. | ............. | 719/313 |
| 7,028,122 B2* | 4/2006 | Williams | ............. | 710/260 |
| 7,093,259 B2* | 8/2006 | Pulsipher et al. | ............. | 718/106 |
| 7,096,029 B1* | 8/2006 | Parupudi et al. | ............. | 455/456.1 |
| 7,103,628 B2* | 9/2006 | Neiman et al. | ............. | 709/201 |
| 7,533,168 B1* | 5/2009 | Pabla et al. | ............. | 709/224 |
| 2003/0177166 A1* | 9/2003 | Robertazzi et al. | ............. | 709/105 |
| 2003/0237084 A1* | 12/2003 | Neiman et al. | ............. | 718/102 |
| 2004/0103218 A1* | 5/2004 | Blumrich et al. | ............. | 709/249 |
| 2005/0022195 A1* | 1/2005 | Davis et al. | ............. | 718/100 |
| 2005/0081097 A1* | 4/2005 | Bacher et al. | ............. | 714/13 |
| 2005/0114862 A1* | 5/2005 | Bisdikian et al. | ............. | 718/105 |
| 2006/0017953 A1* | 1/2006 | Ly et al. | ............. | 358/1.13 |
| 2006/0031842 A1* | 2/2006 | Neiman et al. | ............. | 718/103 |
| 2006/0048155 A1* | 3/2006 | Wu et al. | ............. | 718/101 |
| 2006/0048157 A1* | 3/2006 | Dawson et al. | ............. | 718/104 |
| 2006/0212740 A1* | 9/2006 | Jackson | ............. | 714/4 |
| 2006/0215583 A1* | 9/2006 | Castagnoli | ............. | 370/254 |
| 2007/0260669 A1* | 11/2007 | Neiman et al. | ............. | 709/201 |

* cited by examiner

*Primary Examiner* — Jennifer To
*Assistant Examiner* — Benjamin Wu
(74) *Attorney, Agent, or Firm* — Libby Z. Toub, Esq.; Kevin P. Radigan, Esq.; Heslin Rothenberg Farley & Mesiti P.C.

(57) ABSTRACT

The present invention employs a master node for each job to be scheduled and in turn the master node distributes job start information and executable tasks to a plurality of nodes configured in a hierarchical node tree of a multinode job scheduling system. The status of the various tasks executing at the leaf nodes and other nodes of the tree report status back up the same hierarchical tree structure used to start the job, not to a scheduling agent but rather to the master node which has been established by the scheduling agent as the focal point, not only for job starting, but also for the reporting of status information from the leaf and other nodes in the tree.

21 Claims, 2 Drawing Sheets

DYNAMIC ALLOCATION AND PARTITIONING OF COMPUTE NODES IN HIERARCHICAL JOB SCHEDULING

TECHNICAL FIELD

The present invention is generally directed to a job scheduling system in an environment which includes a large plurality of data processing nodes. More particularly, the present invention is directed to providing a hierarchical structure for the return of job or task status information so as to relieve bottlenecks created at a scheduling agent especially when there are a large plurality of nodes carrying out the job.

BACKGROUND OF THE INVENTION

Scheduling parallel workloads in a High Performance Computing (HPC) cluster is an increasingly complex task, especially when it concerns scalability and performance of the scheduling agent. This is because clusters are being used to solve extremely large and complicated problems. This has led to an increase in the number of nodes required to execute a parallel job by an order of magnitude or more. By implication, the total number of nodes in a typical HPC cluster has gone up by an order of magnitude as well.

When hundreds of compute agents running across the cluster attempt to report the status of a job to a scheduling agent running on a single node, the scheduling agent quickly becomes a performance bottleneck under the heavy communication load. In many cases, this scenario could also lead to the failure of the scheduling agent.

Most batch schedulers attempt to provide a scalable mechanism for submitting or starting execution of a parallel job. Usually, this involves an efficient one-to-many communication scheme. When a large number of compute agents running on different nodes in the cluster report job status to a single scheduling agent running on a single node, the communication load can overwhelm the scheduling agent.

One solution could be to serialize processing of status reports at the scheduling agent, while another could be to proceed with job scheduling steps without collecting a complete report of the current job status. While the former approach results in a performance bottleneck, the latter causes delays in recognizing failures which in turn affects the reliability of the scheduling agent.

SUMMARY OF THE INVENTION

The present invention proposes a reporting framework solution that enhances the scalability and performance of the scheduling agent by relying on dynamic, hierarchical aggregation of data.

The shortcomings of the prior art are overcome and additional advantages are provided through the use of a system and method for scheduling jobs in a multinode job scheduling system, the method comprising the steps of: passing job start information from a scheduling agent to a master node; passing the job start information from the master node to a tree structure of nodes in the multinode job scheduling system; providing an indication, from the nodes in the tree structure, to the master node, that the respective nodes are ready to receive an executable task; transferring executable tasks to the nodes in the tree; starting the executable tasks on the nodes of the tree; and returning job status information from the nodes in the tree to the master node along the same node tree structure. Additionally, the present invention provides a method for reporting job status in a multinode job processing system, which comprises: preserving information regarding a hierarchical tree of compute nodes, established during job launch in respective ones of memory systems in the compute nodes; and, at least during job execution, returning job status information from the compute nodes to a master node higher in said tree.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

Figure 1:
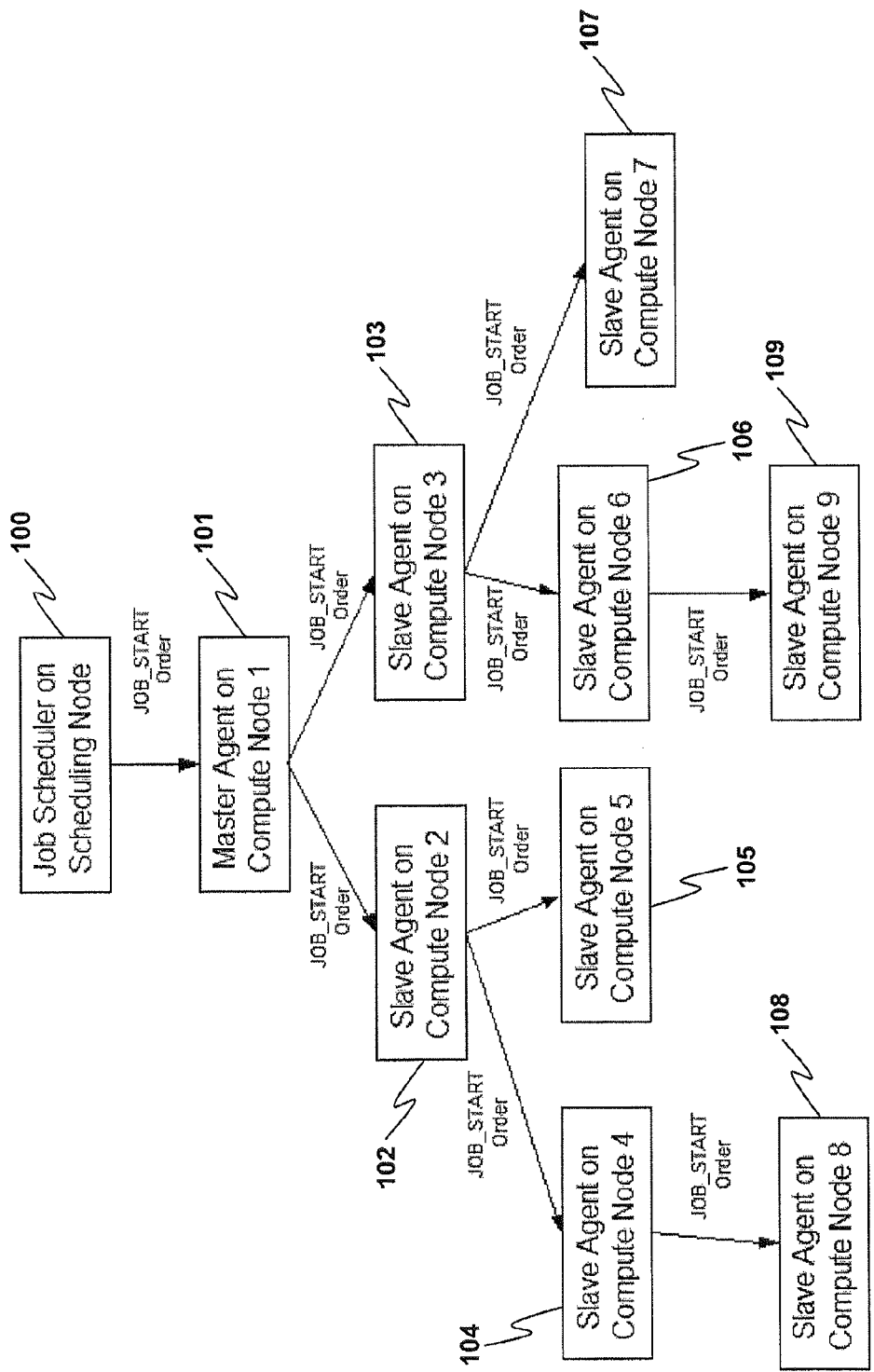
FIG. 1 is a flow diagram illustrating the propagation of a job start order in an hierarchical communication framework.

When a job is submitted for execution, the scheduling agent determines a set of nodes on which this job can run based on the requirements of the job as well as the availability of necessary resources on these compute nodes. Each compute node runs an agent that is capable of reporting the status of jobs dispatched to them for execution.

To start the job, the scheduling agent sets up a master compute node and sends the job object to it in a JOB_START transaction. This master compute node forwards this "job start order" to a predetermined number of slave nodes while initiating the hierarchical job launch tree. The master node informs each slave node who its child nodes are. Each slave node further forwards the job to its children until all the nodes on which the job runs have received the job start transaction (See FIG. 1).

Every node in the tree now communicates that it is ready to receive the executable or task(s) to be run. In most existing schemes, all of the agents on the compute nodes report their status directly to the scheduling agent. Job status reports from compute nodes to the scheduling agent are sent at other times too, such as, when the compute node is ready to run a job, when a job has started running, when a job completes running or when the scheduler has to be informed of the resources being consumed by running jobs. In a large cluster running jobs in a parallel environment, many hundreds of compute agents may simultaneously try to send job status reports to a lone scheduling agent. This can impose a large communication load on the scheduling agent and may even lead to its failure. The present invention alleviates this problem.

The solution proposed is to reuse the Hierarchical Job Tree that was set up for starting the job. The same tree structure is used in the reverse direction for consolidation, propagation and delivery of job status reports to the scheduling agent (See FIG. 2). Each compute agent running on a compute node retains knowledge of its immediate parent and its entire subtree of child nodes. The compute agents persist this information for each job executed by them during the lifespan of that job. Other metadata, such as fan-out of the hierarchical tree and message delivery attributes are also persisted in the agent's memory. Each tree is job-specific, so, there are as many trees to retain at each compute agent as there are parallel jobs running on that node. A parent node in the tree makes its immediate children aware of their sub trees of child nodes when delivering a job start order. The hierarchical tree structure is written to hard disk by each compute agent to assist with recovery in the event that the compute agent crashes.

When job status is reported, the compute agents at the leaf-nodes of the tree send the status of the portion of the job being monitored by them to the agent running on their parent compute nodes. The agent running on the parent compute node waits for, receives and consolidates all the status reports from its children. After this, it appends its own status report to all the others that are received. It then sends the consolidated report to the agent running on its parent node. In this manner, a single consolidated report is prepared and submitted by the agent running on the master compute node to the scheduling agent.

This method drastically reduces communication load on the scheduling agent and distributes it across all of the compute agents that are participating in the execution of the job. While the collection and consolidation of reports is likely to be slower than if all compute agents reported directly to the scheduling agent, the reduction in communication load at the scheduling agent significantly improves its scalability and responsiveness. This approach to job status reporting makes a scheduling agent scalable across a cluster that contains thousands of nodes or even many thousands of nodes.

FIG. 1 is illustrative of the system and method provided by the present invention in particular, there is shown data processing nodes 100 through 109. Node 100 is the node on which a scheduling agent resides. In prior art systems this scheduling node would be in communication for the purpose of receiving status and update information with all of the other nodes carrying out jobs which have been launched by the scheduling agent. In the present invention there is provided for each job a master agent running on one of the so-called compute nodes. In the present invention this compute node 101 having a master agent is a node that is in communication with the other nodes. In the particular example shown, the master agent on node 101 establishes a tree of other compute nodes running slave agents, as shown. In particular, for the example shown, node 101 employs two slave agents on nodes 102 and 103 respectively. This tree information in structure is passed on by the slave agents to the subnodes in the tree. For example the slave agent running on node 102 passes information to nodes 104 and 105 and its subtree. Likewise, in turn, node 104 passes information to node 108. As seen in FIG. 1, the job start order that initiates at scheduling node 100 is first applied to the master agent on node 101 and from there down the tree setup by the scheduling agent.

Figure 2:
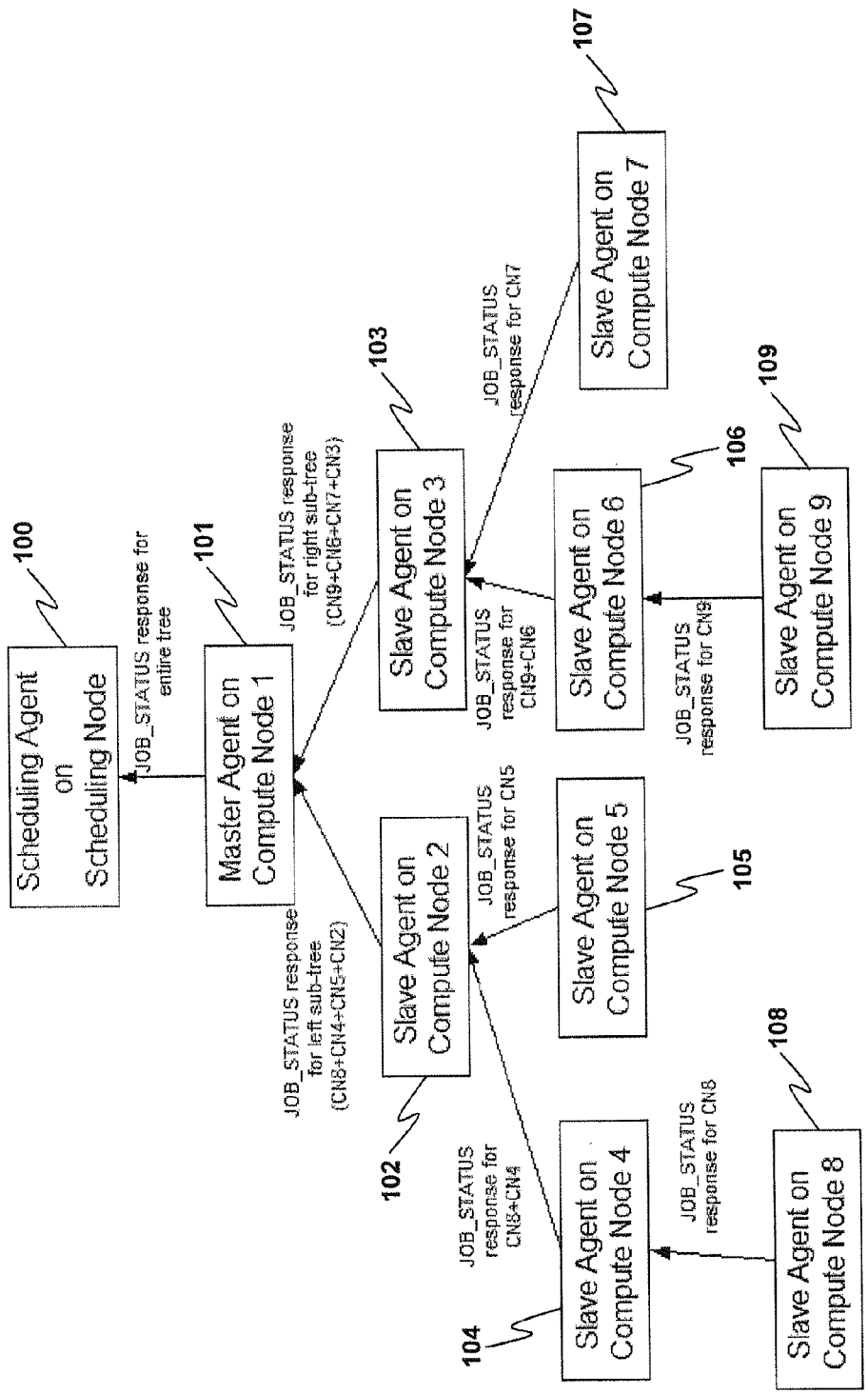
FIG. 2 is a flow diagram illustrating the use of agents on nodes in the hierarchy that are used to report readiness and status to job a scheduler but through a master node.

FIG. 2 is similar to FIG. 1 except that it shows the process in reverse insofar as the passage of job status information back to the scheduling agent is concerned. Most relevant for an the understanding of the operation of the present invention it should be noted that, when node 104 responds with status information to node 102, this information includes a consolidation of job status information from nodes 108 and 104. The figure depicts this process for a generic "JOB_STATUS" report. It is also noted that the expression "CN8+CN4" is a shorthand notion to indicate that the information being passed back comes from compute node 4 and compute node 8.

It is noted that the figures herein are exemplary for purposes of better understanding the operation of the invention. The fact that only a few nodes are shown should not be construed as limiting the invention to just a few nodes. In fact, the greater the number of nodes running the job, the greater is the need for the present invention. Nor should it be construed that the present invention, in its broad embodiment, requires as many nodes as are shown in the exemplary figures. It is also noted that in several of the cases shown if FIGS. 1 and 2, a node is shown as having only two child nodes. In general, the present invention contemplates the use of any practical number of nodes as being child nodes. The width and depth of the tree are programming design choices that depend in large part on the number of nodes employed and the nature of the tasks being performed in parallel.

The system and method described herein provide several significant advantages that are to be especially noted. In particular, the reliability of the scheduling agent is increased by reducing the scope of communication failures, since each agent communicates with a limited, fixed set of agents. The performance of the scheduling agent is also improved by distributing its workload among several lightly loaded agents, thereby increasing the number of jobs that it can simultaneously schedule thus decreasing the time it takes to process each job. Additionally, the scalability of the scheduling agent is enhanced since a much larger number of compute nodes are able to participate in executing a job without causing a failure of the scheduling agent.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:
1. A method of reporting job status comprising:
obtaining from a parent node, by a plurality of compute nodes, one or more portions of a job to be executed by the plurality of compute nodes, together with information indicating a plurality of child nodes that are children to the plurality of compute nodes that are available to accept at least one portion of the job, the plurality of compute nodes and the plurality of child nodes being in a hierarchical relationship, wherein the plurality of compute nodes are higher in the hierarchical relationship than the plurality of child nodes and wherein the parent node is higher in the hierarchical relationship than the plurality of compute nodes;
executing by the plurality of compute nodes at least one portion of the job;
forwarding by the plurality of compute nodes to the plurality of child nodes at least one portion of the job to be executed by the plurality of child nodes;
receiving by a node of the plurality of compute nodes from at least one child node of the plurality of child nodes status information regarding the at least one portion of the job executed by the at least one child node;
consolidating by the node the status information received from the at least one child node with status information regarding the at least one portion of the job executed by the node to provide consolidated status information, the consolidated status information including status information from the at least one child node and from the node itself; and providing to the parent node the consolidated status information.

2. The method of claim 1, wherein the node includes an agent for receiving the status information.

3. The method of claim 2, wherein the agent is able to concurrently process status information from at least two jobs.

4. The method of claim 1, wherein the node, during execution of the job, retains an indication of the plurality of child nodes of the node.

5. The method of claim 1, wherein the status information includes at least one of node readiness, job start, job completion and resource consumption.

6. The method of claim 1, wherein the hierarchical relationship includes a tree structure.

7. The method of claim 6, wherein the tree structure is a binary tree.

8. The method of claim 1, further including providing by the parent node a consolidated status report to a scheduling agent.

9. The method of claim 1, further comprising:
consolidating by the parent node the consolidated status information with status information received from at least one other compute node in the plurality of compute nodes to provide further consolidated status information; and providing the further consolidated status information to a given node higher in the hierarchical relationship than the parent node.

10. The method of claim 1, further comprising: forwarding by the plurality of compute nodes to the plurality of child nodes together with the at least one portion of the job to be executed by the plurality of child nodes, information indicating a plurality of grandchild nodes that are children to the plurality of child nodes and that are available to accept at least one portion of the job.

11. A computer system for reporting job status comprising:
a memory; and
a processor in communications with the memory, wherein the computer system is configured to perform a method comprising:
obtaining from a parent node, by a plurality of compute nodes, one or more portions of a job to be executed by the plurality of compute nodes, together with information indicating a plurality of child nodes that are children to the plurality of compute nodes that are available to accept at least one portion of the job, the plurality of compute nodes and the plurality of child nodes being in a hierarchical relationship, wherein the plurality of compute nodes are higher in the hierarchical relationship than the plurality of child nodes and wherein the parent node is higher in the hierarchical relationship than the plurality of compute nodes;
executing by the plurality of compute nodes at least one portion of the job;
forwarding by the plurality of compute nodes to the plurality of child nodes at least one portion of the job to be executed by the plurality of child nodes;
receiving by a node of the plurality of compute nodes from at least one child node of the plurality of child nodes status information regarding the at least one portion of the job executed by the at least one child node;
consolidating by the node the status information received from the at least one child node with status information regarding the at least one portion of the job executed by the node to provide consolidated status information, the consolidated status information including status information from the at least one child node and from the node itself; and
providing to the parent node the consolidated status information.

12. The computer system of claim 11, wherein the status information includes at least one of node readiness, job start, job completion and resource consumption.

13. The computer system of claim 11, wherein the hierarchical relationship includes a tree structure, and wherein the tree structure is a binary tree.

14. The computer system of claim 11, wherein the method further comprises providing by the parent node a consolidated status report to a scheduling agent.

15. The computer system of claim 11, wherein the node includes an agent for receiving the status information, and wherein the agent is able to concurrently process status information from at least two jobs.

16. A computer program product for reporting job status comprising:
a non-transitory storage medium readable by a processor and storing instructions for execution by the processor for performing a method comprising:
obtaining from a parent node, by a plurality of compute nodes, one or more portions of a job to be executed by the plurality of compute nodes, together with information indicating a plurality of child nodes that are children to the plurality of compute nodes that are available to accept at least one portion of the job, the plurality of compute nodes and the plurality of child nodes being in a hierarchical relationship, wherein the plurality of compute nodes are higher in the hierarchical relationship than the plurality of child nodes and wherein the parent node is higher in the hierarchical relationship than the plurality of compute nodes;
executing by the plurality of compute nodes at least one portion of the job;
forwarding by the plurality of compute nodes to the plurality of child nodes at least one portion of the job to be executed by the plurality of child nodes;
receiving by a node of the plurality of compute nodes from at least one child node of the plurality of child nodes status information regarding the at least one portion of the job executed by the at least one child node;
consolidating by the node the status information received from the at least one child node with status information regarding the at least one portion of the job executed by the node to provide consolidated status information, the consolidated status information including status information from the at least one child node and from the node itself; and
providing to the parent node the consolidated status information.

17. The computer program product of claim 16, wherein the status information includes at least one of node readiness, job start, job completion and resource consumption.

18. The computer program product of claim 16, wherein the hierarchical relationship includes a tree structure, and wherein the tree structure is a binary tree.

19. The computer program product of claim 16, wherein the method further comprises providing by the parent node a consolidated status report to a scheduling agent.

20. The computer program product of claim 16, wherein the node includes an agent for receiving the status information, and wherein the agent is able to concurrently process status information from at least two jobs.

21. The computer program product of claim 16, wherein the method further comprises:
consolidating by the parent node the consolidated status information with status information received from at least one other compute node in the plurality of compute nodes to provide further consolidated status information; and providing the further consolidated status information to a given node higher in the hierarchical relationship than the parent node.

* * * * *